United States Patent Office 3,538,425
Patented Nov. 3, 1970

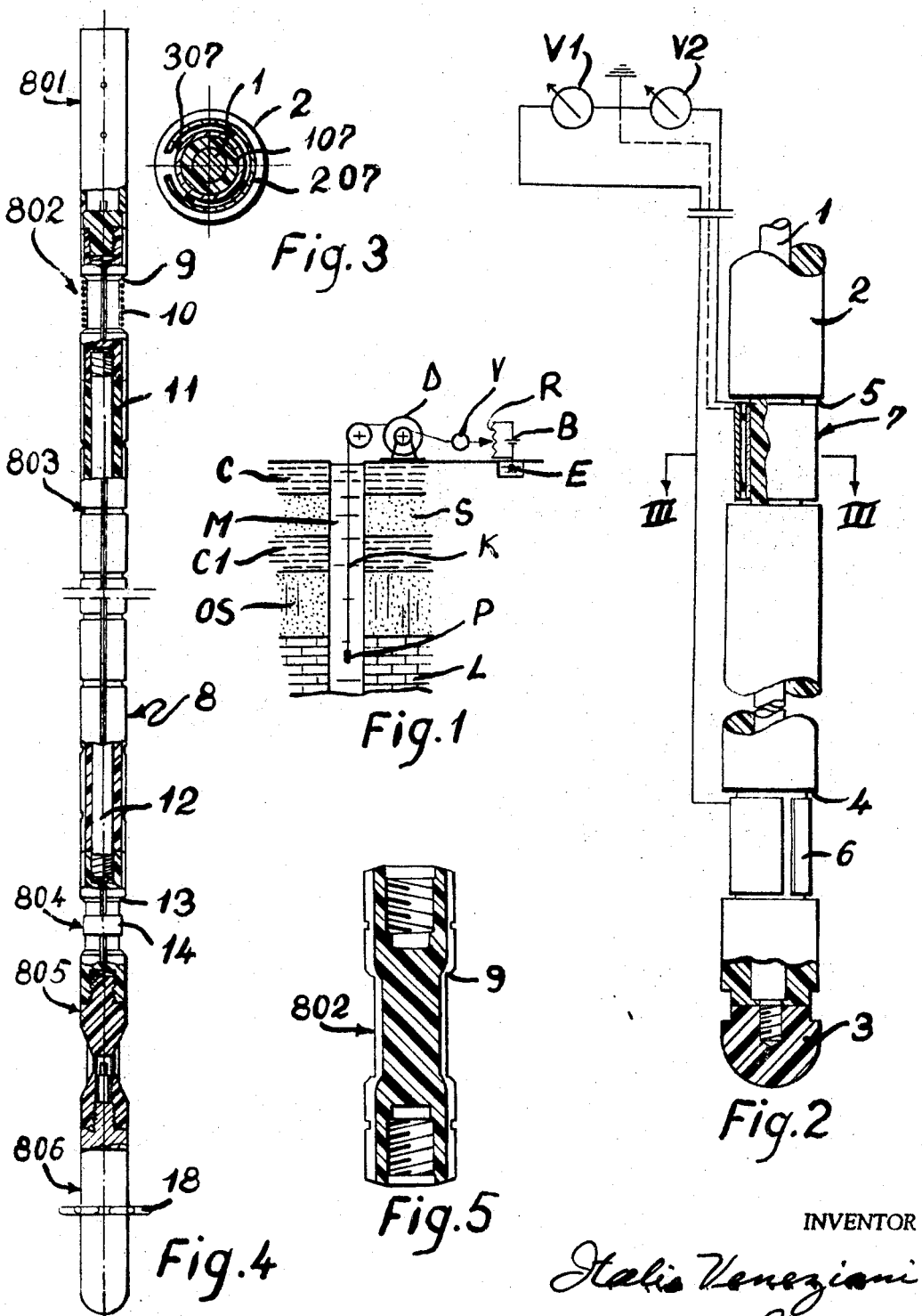

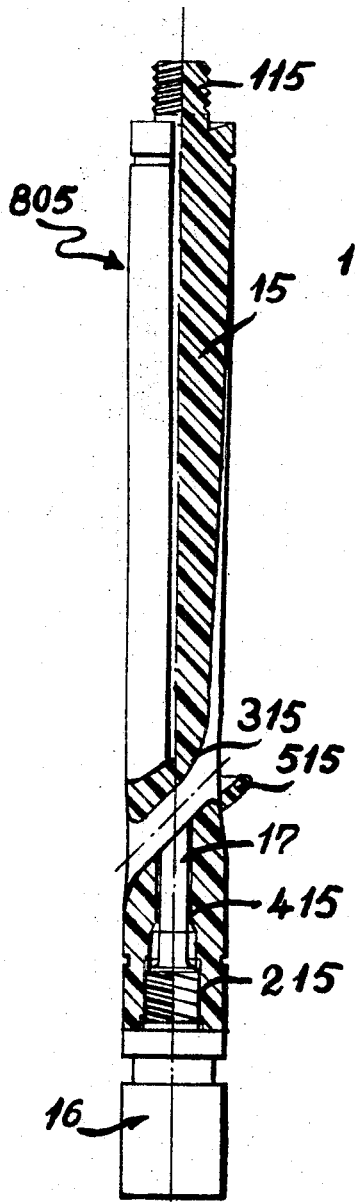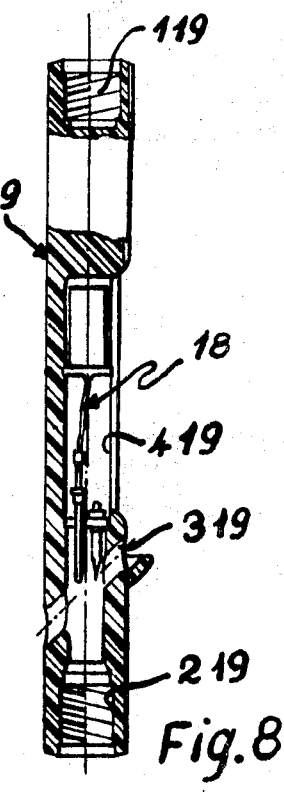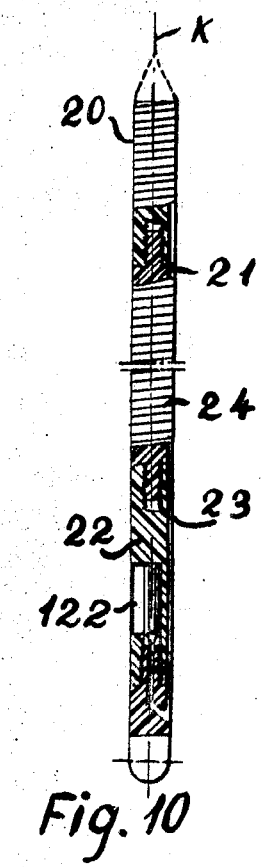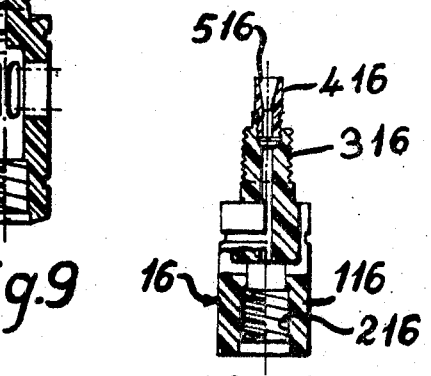

3,538,425
ELECTRICAL WELL-LOGGING PROBE HAVING REDOX-REVERSIBLE AND REDOX-NONREVERSIBLE ELECTRODES
Italo Veneziani, Via Castiglione 20, Bologna, Italy
Filed Jan. 18, 1968, Ser. No. 698,920
Claims priority, application Italy, Jan. 21, 1967, 6,740/67; Sept. 5, 1967, 7,272/67
Int. Cl. G01v 9/00, 3/18
U.S. Cl. 324—1         1 Claim

ABSTRACT OF THE DISCLOSURE

A multielectrodes probe for the electrical well logging of earth formations by sensing the redox potential arising in a mud filled borehole. The probe is formed by a subtantially rigid elongated body, to which at least one redox potential measuring electrode and one reference electrode are secured, the said electrodes being individually connected to distinct conductors of the probe-running cable. The probe is made up by a plurality of interconnected body sections, each designed to perform distinct functions, as for instance electrode holder sections, spacing and weight sections, and the like. The said sections may be easily assembled together so as to compose a probe which is the most suitable for the different measurements required during the logging operation.

---

This invention relates to the electrical prospection of boreholes or wells, and more particularly to a probe for the electrical logging of earth formations by sensing the redox potential arising in a mud-filled borehole, as described in the U.S. Pat. No. 3,098,198 to G. Bartolini Salimbeni, to which reference is made for a more full explanation of the principles of the redox potential logging method.

As described in the said prior U.S. Pat. No. 3,098,198, a redox logging apparatus for locating subsurface formations along a borehole filled with mud basically comprises at least one redox logging electrode, a sensitive electric potential-measuring instrument, a flexible cable for running the said redox logging electrode along said borehole and electrically connecting said electrode to said potential-measuring instrument, and a reference electrode electrically connected to said potential-measuring instrument, with the interposition of a suitable adjustable resistor.

It has been found, according to the present invention, that the best results in the redox potential logging method may be achieved by running along the borehole at least one redox logging electrode together with at least one reference electrode, the latter selected so as to furnish an electrode potential differing as far as possible from the redox electrode potential.

It is accordingly the main object of the present invention to provide a multielectrodes probe for the electrical well logging with the redox potential method in which, on the same probe, at least one redox potential electrode and one reference electrode are assembled, the said electrodes being electrically connected to distinct conductors of the probe-running cable.

According to a still further development of the present invention, the reference electrode is in the form of an electrode system, composed of a pair of metallic electrodes, one of which is made of a redox-reversible metal, and the second one is made of a redox-nonreversible metal, the said electrodes being assembled on the probe at a very close distance and electrically insulated from one another, so as to constitute the elements of a voltaic cell. On the same probe, a redox potential-measuring electrode is also assembled, at a relatively great distance from said reference electrode system.

As redox potential-measuring electrodes, gold or platinum electrodes are used. As reference, nonreversible electrodes, steel, iron, lead, antimony, tungsten, tin or other metallic electrodes may be used.

According to a still further feature, the probe of the present invention may be composed of a plurality of sections, in which the single sections of the probe may be assembled together, for insatnce by means of threaded ioints, so as to compose a probe which is the most suitable for the different measurements required during the logging operation.

The above and other advantages of the present invention will become more apparent from the following specification of some preferred embodiments of the invention, shown by way of example in the accompanying drawings, in which:

FIG. 1 is a diagrammatic section through the subsoil formations in correspondence of a borehole into which a redox logging apparatus, comprising a redox logging probe, has been run along the borehole.

FIG. 2 is a view, with parts broken away, of a probe according to the present invention, showing the electrical connections of said probe to the measuring apparatus.

FIG. 3 is a cross-section taken on line III—III of FIG. 2.

FIG. 4 is a second embodiment of a plurisections multielectrode probe according to the invention.

FIG. 5 is a vertical section through an electrode-holding element for a probe according to the invention.

FIG. 6 shows one section of the probe of FIG. 2 in enlarged scale, with parts broken away.

FIG. 7 is a vertical section of an inner electrode-carrying element for a probe according to the invention.

FIG. 8 is a vertical section with parts in side view of another electrode-carrying member for a probe according to the invention, employing a chemical electrode.

FIG. 9 is a sectional side view of another connecting member for the parts of a probe according to the invention, and FIG. 10 is a side view, with parts in section of another embodiment of a probe according to the invention, which is particularly suitable for geological and hydrological loggings.

With reference to the drawings, FIG. 1 shows a redox logging apparatus which comprises a redox logging probe P suspended to one end of an insulated conductive cable K coiled on a drum D and connecting said probe to one of the terminals of a very sensitive potential-measuring instrument or millivoltmeter V. The reference electrode E, which may be a calomel electrode, is immersed in a small sump formed in the earth near the borehole and is connected to the other terminal of the said millivoltmeter V through one section of a resistor R and its movable contact, while the other section of the said resistor is connected to said electrode E through a source of electric potential B, the whole forming a kind of adjustable electric bridge.

By this arrangement, when the probe P is run through the mud M in the borehole, when it passes in correspondence of some formations such as those composed of clay C and Cl, sand S is limestone L, it assumes a potential which is different from that which it assumes in correspondence of the oil sand layer OS.

According to the present invention, it has been found that the best results in the redox logging method may be achieved whenever on the same probe P a number of electrodes are assembled, at spaced intervals, and more specifically whenever on the same probe at least one redox-reversible electrode is assembled together with one or more reference electrodes.

In FIG. 2, a practical embodiment of a probe according to the invention is shown. According to the said embodiment, the probe comprises a core 1 made of an iron or steel bar, coaxially inserted in an outer cylindrical sleeve 2 made of electrically insulating material, such as rubber or plastic material. The core bar 1 extends for the whole length of the probe, and is of such a thickness as to resist to bending stresses of the probe during the logging operation. The said core bar provides also the necessary weight for running the probe down the borehole. At its lower end, the core bar 1 extends axially a short distance beyond the end of the sleeve 2 with a screw-threaded section on which a cap 3 of insulating plastic material is screwed. Within the sleeve 2, at predetermined distances, annular grooves 4, 5 are formed, housing the logging electrodes. Inside groove 4 a reversible redox electrode 6 is housed which, in the embodiment as shown, is made by a thin rectangular sheet of a suitable metal (Au or Pt), rolled up all around the cylindrical bottom of groove 4. Inside groove 5 the reference electrode system 7 is housed. The said electrode system is a composite electrode, and is formed, as best shown in FIG. 3, by an inner cylindrical electrode 107 made up of a sheet of redox-reversible metal, and for example from a thin sheet of gold, rolled up on the bottom of groove 5. A second cylindrical electrode 207, electrically insulated from electrode 107 by means of insulating spacing members 307 is mounted coaxially around electrode 107. The electrode 207 is made of nonreversible metal, such as lead or iron. The electrodes 107 and 207 thus form the elements of a voltaic cell whenever the probe is immersed into the mud inside of the borehole. The electrodes 6, 107 and 207 are connected through leads to suitable measuring devices, of the kind described with reference to FIG. 1, and comprising the millivoltmeters V1 and V2.

In FIG. 4 a second embodiment of probe is shown. According to the said embodiment of the invention, the probe generally designated with the reference numeral 8, is formed by a plurality of sections 801, 802, 803, 804, 805, 806 connected together by means of screw-joints. Section 801 is the head-section of the probe 8. To the said section the leading end of the multiwire running cable (not shown) is connected. To said first section, the reference electrode-carrying section 802 is screwed. The said section 802 is formed by a short cylindrical member, like the one shown in FIG. 5, of rigid plastic material, provided at both ends with blind axial screw-threaded bores. In the outer cylindrical surface of member 802 a cylindrical groove 9 is formed, in which the reference electrode 10 is housed, which is formed by a length of metallic wire, for example lead wire helically wound around the bottom of groove 9. Of course, instead of using a single wire for formation of electrode 10, a composite electrode may be provided, like electrode 7 of the probe shown in FIG. 2, by winding a wire of a redox-reversible metal, and for instance a Pt wire, in the spaces between the windings of the lead wire.

To the end of section 802 a third section 803 is connected, formed by a cylindrical body 11 of plastic material or rubber, provided axially with a stiffening core core formed by an iron rod 12. The said intermediate section 803 is of a certain length so as to provide for the required axial spacing of the reference electrode 10 from the following reversible-redox electrodes, mounted on the lower end of the probe 8, as it will be described hereinafter.

To section 803 an electrode-bearing section 804 is screwed. As shown, the said section 804 is quite similar to section 802. Inside the groove 13 of section 804 a Pt electrode 14 is housed. The said electrode is similar to electrode 6, described with reference to the embodiment of FIG. 2.

To section 804 of probe 8 a further electrode-housing probe section 805 is screwed. The said section 805, as best shown in FIG. 6, is formed by a cylindrical body 15 of a hard resin composition, and for instance a melaminic resin, provided at one end with an axial threaded extension 115 for screwing into a correspondingly threaded bore of the lower end of probe section 804, and provided at its opposite end with a threaded bore 215. The body 15 is provided with a transversal inclined through passage 315 suitably shaped so as to permit the free flow of the mud through it during both the lowering and the lifting of the probe along the borehole. Bore 215 is counterbored by a bore 414 extending from the bottom of bore 215 up to the transversal bore 315. In bore 205 the electrode-holder 16 is screw-secured. The said electrode holder 16, as best shown in FIG. 7, is formed by a cylindrical body of resin 116, provided at its lower end with a blind screw-threaded axial boring 216, whilst at its opposite end it is provided with a threaded extension 316 which may be screwed in bore 215 of section 805. At the end of extension 316 a second cylindrical extension 416 is formed, having an external diameter substantially corresponding to the inner diameter of bore 415. The extensions 416 and 316 are provided with an axial bore 516 communicating with the exterior through a suitable radial bore formed in member 116. Into bore 516 the lower end of electrode 17 is inserted, the upper end of which is conducted through bore 415 up to the transversal passage 315. 515 is a small baffle or mud deflector, fitted around the lower end of bore 315, for the purposes of conveying the mud through bore 315 during the lifting of the probe along the borehole.

The probe 8 of FIG. 4 is completed by the tip section 806, which is provided with a centering member 18 comprising a crown of rubber fingers, and serving the purposes of maintaining the probe 8 out of contact with the borehole walls.

In FIG. 8 an electrode-housing probe section is shown, which may be mounted for instance in probe 8, in lieu of probe section 802, or may be also added to probe 8 as a new electrode-housing section, or else may be screwed to the tip of probe 7 of FIG. 2, in lieu of the tip member 3, or also may be otherwise combined with other electrode-housing sections to form a new probe.

The probe section shown in FIG. 8 is designed to contain a chemical electrode, and for instance a calomel electrode, indicated in its whole by the reference numeral 18. The said calomel electrode needs not to be described with more details, since it is of known construction. As shown in FIG. 8, the probe section indicated by 19 comprises a cylindrical body made of plastic material, provided at its upper end with a blind, screw-threaded bore 119 for connection to another probe section, and provided at its lower end with an axial, screw-threaded bore 219 communicating with a slanting transversal through bore 319 similar to bore 315 of probe section 805, previously described, and serving the same purposes. Inside of bore 219 an electrode holder, like electrode holder 16 of FIG. 7, previously described, may be screwed. The probe section 19 is furthermore provided with a wide longitudinal recess 419, communicating at its bottom end with the transversal through bore 319. Inside of recess 419 the chemical electrode 18 is secured in any suitable manner, and for instance by sizing it to the probe section internal walls by means of a suitable plastic cement.

In FIG. 9 a suitable connector is shown, which may be used for connecting together two probe sections. The said connector may be, for instance screwed to the lower end of probe section 19, in lieu of electrode holder 16, whenever the presence of a second electrode on said probe section 19 is not required.

In FIG. 10 another probe according to the invention is shown, which is particularly well suited for hydrological logging operations. As shown, the said probe is composed of three sections, screw-connected together. The upper section, designed 20, is made of plastic material. The said section is connected to the descending cable K. The intermediate section 21 is made of iron, and the lower section 22 is again made of plastic material, and is provided, like probe section 19 of FIG. 8, with a longitudinal recess 122 for housing a suitable electrode, which may be a chemical electrode. A longitudinal groove 23 is formed on the sections 20, 21, and 22 of the probe of FIG. 10, for housing the leads from electrode-housing recess 122 up to the connection to cable K. The sections 20 and 21 of said probe are externally lined with a suitable insulating band 24, which also cover and protect the leads housed in groove 23.

The operation of the described probes is quite evident. For a more fully explanation of the redox logging operation, reference is made to the cited U.S. Pat. No. 3,098,198 to G. Bartolini Salimbeni.

It is evident that by the present invention a probe has been provided which may be easily dismounted into a plurality of short sections, which may be easily transferred from one place to another. Furthermore, according to the present invention it is possible, by combining a number of probe elements, to provide for each logging operation the most suitable of the probes.

It is also possible to provide on a probe also a chemical reference electrode, in contact with the mud of the borehole, and further advantages arising from my invention will be evident to those skilled in the art to which it appertains.

Having thus fully described my invention, what I claim as new is:

1. A probe for the electrical well logging of subsurface formations by sensing the redox potential arising in a mud filled borehole, comprising an elongated cylindrical body, at least one measuring, redox-reversible electrode secured to said body, at least one reference, redox-nonreversible electrode unit secured to said body and in spaced apart relation from said measuring electrode, means for electrically insulating said electrodes from one another and from said body, said reference electrode unit including a first electrode member of redox-reversible metal and a second electrode member of redox-nonreversible metal, said first and second electrode members being in close proximity to one another and electrically insulated one from another to form the elements of a voltaic cell when in contact with the mud of the borehole, and insulated leads for connecting each of the electrode members of said reference unit and said measuring electrode to an insulated descending cable secured to the upper end of said probe.

References Cited

UNITED STATES PATENTS

| | | | |
|---|---|---|---|
| 1,865,847 | 7/1932 | Ennis | 324—2 |
| 2,655,631 | 10/1953 | Walstrom | 324—2 |
| 2,376,168 | 5/1945 | Mounce | 324—1 |
| 2,390,409 | 12/1945 | Aiken | 324—1 |
| 2,564,861 | 8/1951 | Sherborne | 324—1 |
| 2,653,294 | 9/1953 | McMillan | 324—10 |
| 2,694,179 | 11/1954 | Walstrom | 324—1 |
| 2,779,915 | 1/1957 | Moon | 324—10 |
| 2,842,735 | 7/1958 | Martin | 324—10 XR |
| 2,920,266 | 1/1960 | Owen | 324—10 XR |
| 3,098,198 | 7/1963 | Salimbeni | 324—1 |
| 3,293,542 | 12/1966 | Piety | 324—10 |

GERARD R. STRECKER, Primary Examiner

U.S. Cl. X.R.

324—10, 29